(12) United States Patent
Atchley

(10) Patent No.: US 8,704,089 B2
(45) Date of Patent: Apr. 22, 2014

(54) FOUNDATION MEMBER WITH CABLE THEFT DETERRENT DEVICE

(75) Inventor: Jacob C. Atchley, Rocheport, MO (US)

(73) Assignee: Hubbell Incorporated, Shelton, CT (US)

( * ) Notice: Subject to any disclaimer, the term of this patent is extended or adjusted under 35 U.S.C. 154(b) by 126 days.

(21) Appl. No.: 13/045,851

(22) Filed: Mar. 11, 2011

(65) Prior Publication Data

US 2012/0230004 A1   Sep. 13, 2012

(51) Int. Cl.
*H02G 7/20* (2006.01)

(52) U.S. Cl.
USPC ............... 174/45 R; 174/38; 439/98; 248/511

(58) Field of Classification Search
USPC .............. 174/45 R, 38, 2, 40 CC, 51; 439/98; 248/511, 73
See application file for complete search history.

(56) References Cited

U.S. PATENT DOCUMENTS

| | | | |
|---|---|---|---|
| 3,257,496 A * | 6/1966 | Hamilton | 174/38 |
| 3,343,704 A | 9/1967 | Terry | |
| 3,988,870 A * | 11/1976 | Snavely | 52/296 |
| 4,243,834 A | 1/1981 | Logioco | |
| 4,267,401 A | 5/1981 | Wilkinson | |
| 4,719,316 A | 1/1988 | Hoffman et al. | |
| 6,327,753 B1 | 12/2001 | Rushing | |
| 6,872,883 B2 * | 3/2005 | Ginsburg | 174/45 R |
| 7,475,575 B1 | 1/2009 | Greenfield et al. | |
| 7,723,612 B2 * | 5/2010 | Butler | 174/45 R |
| 2007/0020974 A1 | 1/2007 | Carlson | |
| 2009/0049661 A1 | 2/2009 | Harmon et al. | |
| 2009/0301777 A1 | 12/2009 | Yribarren | |
| 2011/0095162 A1 * | 4/2011 | Parduhn et al. | 248/519 |

FOREIGN PATENT DOCUMENTS

| | | |
|---|---|---|
| DE | 202005000757 | 3/2005 |
| WO | 02/073762 | 9/2002 |

OTHER PUBLICATIONS

Pelco Products, Inc., Anti-Theft Cable Retainer Plate, 2009, http://www.pelcoinc.com/UtilityProducts/AntiTheftCableRetainerPlate/tabid/121/Default.a. . . .

* cited by examiner

*Primary Examiner* — Dhirubhai R Patel
(74) *Attorney, Agent, or Firm* — Garrett V. Davis; Mark S. Bicks; Alfred N. Goodman

(57) ABSTRACT

A foundation base member is provided for supporting an above ground electrical device such as a light pole and for supplying electrical wiring to the electrical device. The foundation base includes a body for inserting into the ground and has an axial passage for carrying the underground electrical wires to the electrical device. A base member is coupled to the top end of the foundation body and has a passageway aligned with the axial passage of the foundation body for receiving the electrical wires. The base member is adapted for coupling to and supporting the electrical device. A clamping device is received within a recess of the base member for fixing the position of the clamping device with respect to the foundation base. In one embodiment, the clamping device is captured between the foundation base and the electrical device. The wires are clamped in position by the clamping device to prevent unauthorized removal of the wiring.

31 Claims, 7 Drawing Sheets

FOUNDATION MEMBER WITH CABLE THEFT DETERRENT DEVICE

FIELD OF THE INVENTION

The present invention is directed to a foundation member having a cable theft deterrent device to prevent unauthorized removal of electrical cables or wires from a conduit and particularly an underground conduit. The present invention is particularly directed to a foundation member for an electrical device such as a utility or light pole where the foundation member has a clamp assembly to deter theft of underground cable or electrical wires.

BACKGROUND OF THE INVENTION

In recent years, the theft of copper components including copper wires and cables has increased resulting in financial losses to the utility company. Utility companies often run electrical wires and cables through underground conduits extending great lengths. The conduits are generally connected to a box having a chamber that receives the ends of the electrical wires and cables. Suitable connections between the wires can branch to various conduits from the single box. The box typically has an access door or cover to close the box to allow repairs and connections between the lines. There have been many instances where the thief has removed the access door to gain access to the box. The connectors can be cut and wires pulled from the conduits connected to the box. Depending on the location of the box, hundreds of feet of electrical cable or wires can be pulled from the conduits and sold for its scrap value.

Screw foundations are commonly used for supporting an electrical device such as a light pole. The foundations generally have a cavity for receiving underground wiring and making the required connections to the electrical device. The base of the light pole is attached to the foundation to support the light pole. The base typically has a removable door to allow the installer to access the cavity to make the necessary electrical connections. There has been an increase in theft of the electrical wires by removing the door, cutting the wires from the connectors and pulling the wires from the underground conduit.

Various devices have been proposed to prevent or deter the theft of underground wires and cables. These devices include more secure access doors to prevent unauthorized access. These devices have met with limited success since the doors can be broken resulting in damage to the box or foundation.

One example of a theft deterrent device is WO 02/073762 to Theron disclosing a method of preventing theft of an underground cable by securing the cable at spaced intervals along a length thereof with a series of obstructive elements to engage the outer surface of the cable so that axial movement of the cable relative to the obstructive element is substantially inhibited. The obstructive element may include two opposing plates, each with a semicircular recess and secured with brackets to surround the cable.

U.S. Patent Publication No. 2009/0301777 to Yribarren discloses an apparatus for inhibiting the removal of a cable from a conduit. A clamp moves towards an interior portion of a clamp guide and secures the cable between the clamp and a portion of a clamp guide. The clamp is U-shaped and includes at least one threaded end for engaging a securing mechanism.

U.S. Patent Publication No. 2007/0020974 to Carlson discloses a tamper resistant plug for preventing the removal of wires from a conduit. The plug includes an outer sleeve with a plurality of grooves along the outer circumference for receiving the wire of the conduit. The plug secures the wire in grooves by inserting a connector into a cap and forming a tight fit between the connector, cap, and sleeve.

Other examples of securing devices for cables are disclosed in U.S. Pat. No. 4,267,401 to Wilkinson; U.S. Pat. No. 4,719,316 to Hoffman et al.; U.S. Pat. No. 6,327,753 to Rushing; U.S. Pat. No. 7,475,575 to Greenfield et al.; U.S. Patent Publication No. 2009/0049661 to Harmon et al.; and DE 202005000757 to Rehau AG & Co.

Although these devices have had some limited success for the intended purpose, there is a continuing need in the industry for an improved theft deterrent system.

SUMMARY OF THE INVENTION

The present invention is directed to a foundation member having a cable theft deterrent device to prevent removal of electrical cables and wires from a conduit connected to the foundation member. The present invention is particularly directed to a foundation member for supporting an electrical device such as a utility or light pole where the foundation member has a clamp assembly to clamp the cable to deter theft of the cable passing through underground conduits. The foundation member can be a screw foundation or foundation base that is positioned in or on the ground to support an electrical device.

One feature of the invention is to provide a theft deterrent assembly that can be used in a foundation member and the assembly of the electrical device to prevent the theft of underground wiring and cables.

Another feature of the invention is to provide a foundation member that is able to accommodate a theft deterrent assembly which can be inserted or removed from the foundation member as needed.

Another aspect of the invention is to provide a foundation member having a removable theft deterrent assembly that can be coupled to the foundation member during use to prevent removal of underground cables and wires.

The foundation member of the invention has a body portion adapted for inserting into the ground a sufficient depth to support an electrical device such as a utility pole or light pole. The foundation member is connected to a supply cable or conduit for receiving electrical wires or cables from a supply and carrying the wires to the electrical member. The electrical device is mounted directly to the foundation member. The foundation member is provided with a theft deterrent clamping assembly to clamp the end of the electrical cable or wires in a location that is generally inaccessible once the electrical device is mounted to the foundation member. The theft deterrent assembly prevents the wires and cable from being removed from the foundation member and the conduits connected to the foundation member.

In one embodiment of the invention, the theft deterrent clamp assembly is received within a recess in the top end of the foundation member and is removably coupled to the foundation member. The electrical device is attached to the foundation member so that the clamp assembly is captured between the electrical device and the foundation member, thereby preventing separation of the clamp assembly from the foundation member. The clamp assembly is positioned so that once the electrical device is mounted to the foundation member, the clamp assembly is not readily accessible thereby preventing separation of the clamp assembly from the cables.

These and other aspects of the invention are basically attained by providing a foundation member for supporting an above ground electrical device. The foundation member comprises a foundation body formed in the ground or adapted for inserting into the ground. The foundation body has a top end, a bottom end, and an axial passage for carrying an underground electrical cable to the electrical device. A base is coupled to the top end of the foundation body. The base has an opening and a passageway aligned with the axial passage of the foundation body for receiving the electrical cable and is adapted for coupling to and supporting the electrical device. A clamping device is received in the opening of the base for clamping the electrical cable passing through the opening of the base and deterring theft of the underground cable through the foundation body.

The various aspects and advantages of the invention are also attained by providing a foundation member for supporting an above ground electrical device and deterring theft of underground electrical cable. The foundation member comprises a foundation body portion adapted for embedding in the ground and having a central passage for receiving the underground electrical cable. A clamp assembly is removably received in the passage of the foundation body portion for clamping to an end portion of the underground electrical cable and resisting removal of the underground electrical cable from the body portion and the ground.

The various aspects of the invention are further attained by providing a method of deterring theft of underground electric cable by providing a foundation member having a foundation body embedded in the ground. The foundation body has an axial passage for carrying the electrical cable to the surface of the ground, and a cable clamp assembly captured between a top end of the foundation body and an electrical device mounted on the foundation member. The electrical cable is fed through the foundation body and cable clamp and the electrical cable is clamped to the foundation body to deter removal of the underground cable.

The various aspects of the invention are also attained by providing a foundation member for supporting an electrical device. The foundation member comprises a foundation body adapted for inserting into the ground. The foundation body has a top end, a bottom end, and an axial passage for carrying underground electrical cable to the electrical device. A base is coupled to the top end of the foundation body. The base has a passageway aligned with the axial passage of the foundation body for receiving electrical cable. A clamping assembly for clamping the electrical cable passes through the axial passageway of the base to resist removal of the electrical cable. The clamping assembly has a top end, a bottom end and at least one movable clamping member positioned between the top end and the bottom end for clamping the electrical cable. A shield is coupled to the clamping assembly and has a dimension to obstruct access to the movable clamping member.

These and other aspects of the invention will become apparent from the following detailed description of the invention in connection with the annexed drawings which disclose various embodiments of the invention.

BRIEF DESCRIPTION OF THE DRAWINGS

The following is a brief description of the drawings, in which.

DETAILED DESCRIPTION OF THE INVENTION

The present invention is directed to a foundation member for use in connection with electrical wiring and electrical cables. The foundation member in one embodiment of the invention is adapted for supporting an electrical device above ground and for supplying below ground electrical wiring to the electrical device. The foundation member has a structure and dimension capable of supporting an electrical device and can be embedded in the ground or positioned on the ground. The foundation member can be a screw foundation or base. It will be understood that the ground engaging portion of the foundation member can have any suitable shape that is capable of supporting the electrical device.

Figure 1:
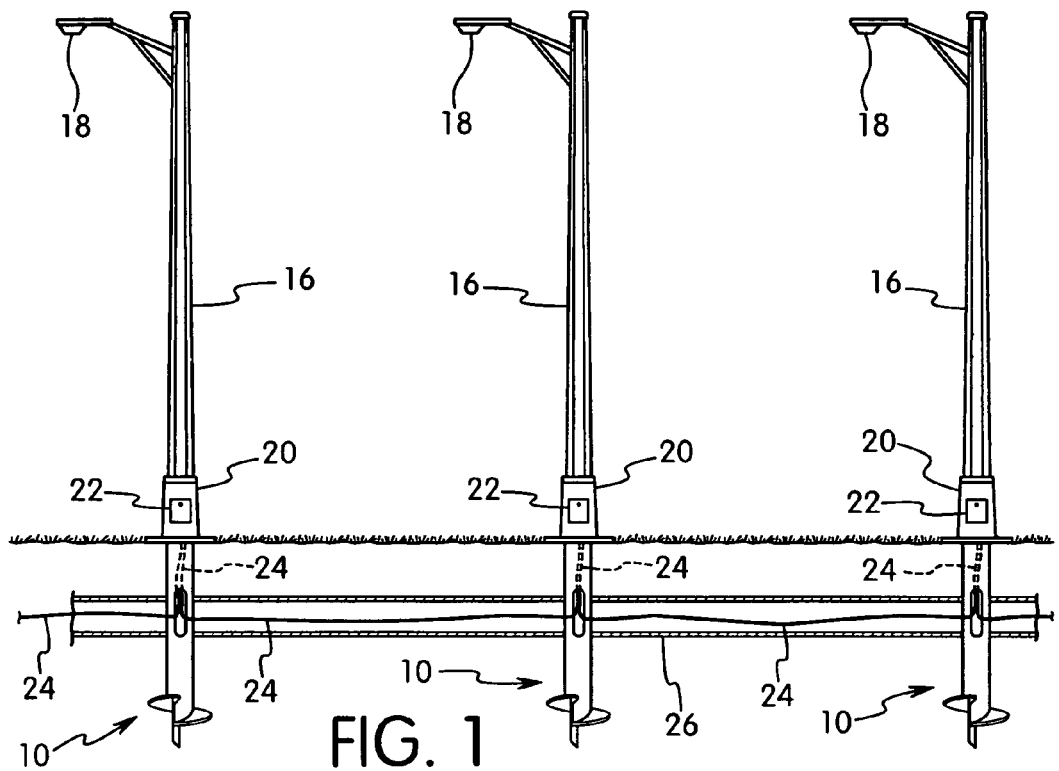
FIG. 1 is an elevational view of a series of foundations members of the invention embedded in the ground and having a utility pole attached to each of the foundation members.

Referring to FIG. 1, the invention is directed to a foundation member assembly 10 having a foundation member 12 and a clamp assembly 14. As shown in the embodiment of FIG. 1, the foundation member assembly 10 is inserted into the ground a sufficient depth to provide a foundation support for an electrical device 16. In the embodiment illustrated, the electrical device 16 is a light pole supporting a lamp 18. The lamp pole 16 includes a base 20 having a hollow cavity and an access door 22 for allowing access to the interior of the base and lamp pole 16. Electrical wiring 24 buried in the ground is fed from a power source to a series of the lamp poles 16 as shown in FIG. 1. Typically, the wiring 24 passes through a conduit 26 which joins with the foundation member 12.

Figure 3:
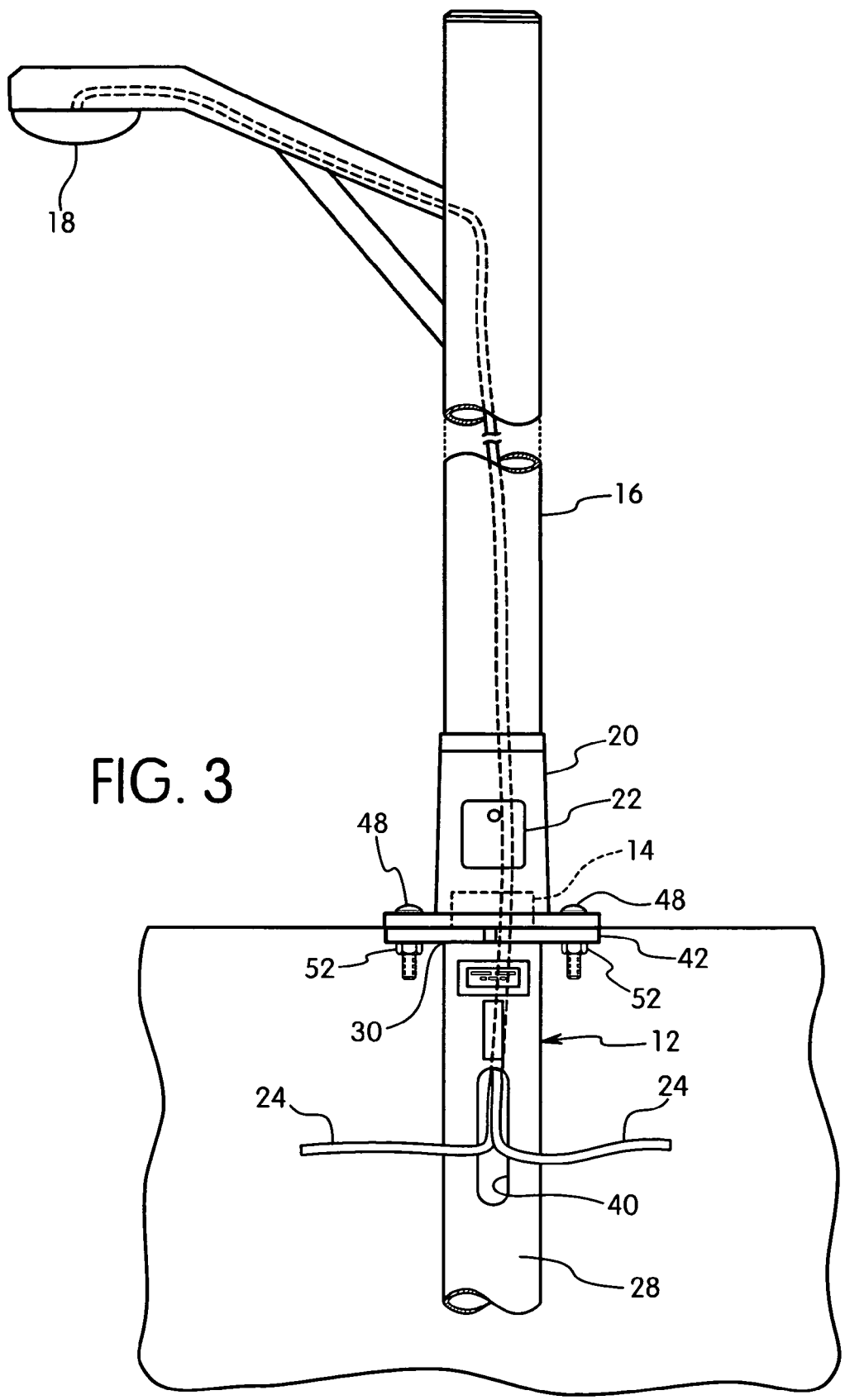
FIG. 3 is an enlarged view showing the foundation member, clamping assembly and utility pole according to one embodiment of the invention.

As shown in FIG. 3, the lamp pole base 20 and the lamp pole 16 generally have an access door 22 to allow access to the axial passage of the base and the lamp pole for making the necessary electrical connections between the power supply and the electrical device. The electrical wires 24 are fed through the foundation member 12 and are coupled to the clamp assembly 14 which is preferably positioned below the location of the access door 22.

Figure 2:
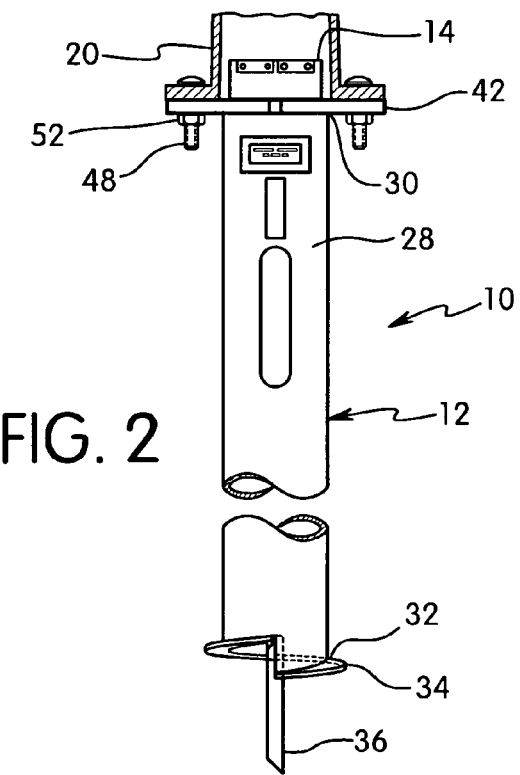
FIG. 2 is a front elevational view of the foundation member and clamp assembly in one embodiment of the invention.

Referring to FIG. 2, the foundation member 12 has a main body portion 28 having a substantially cylindrical shape with a top end 30 and a bottom end 32. In the embodiment shown, the foundation member is a screw foundation that is screwed into the ground. The bottom end 32 is provided with a helical screw 34 and a projection 36 extending axially from the body 28. The helical screw 34 has a shape and dimension for penetrating the ground for driving the foundation member into the ground by a suitable drilling machine as known in the art.

Figure 8:
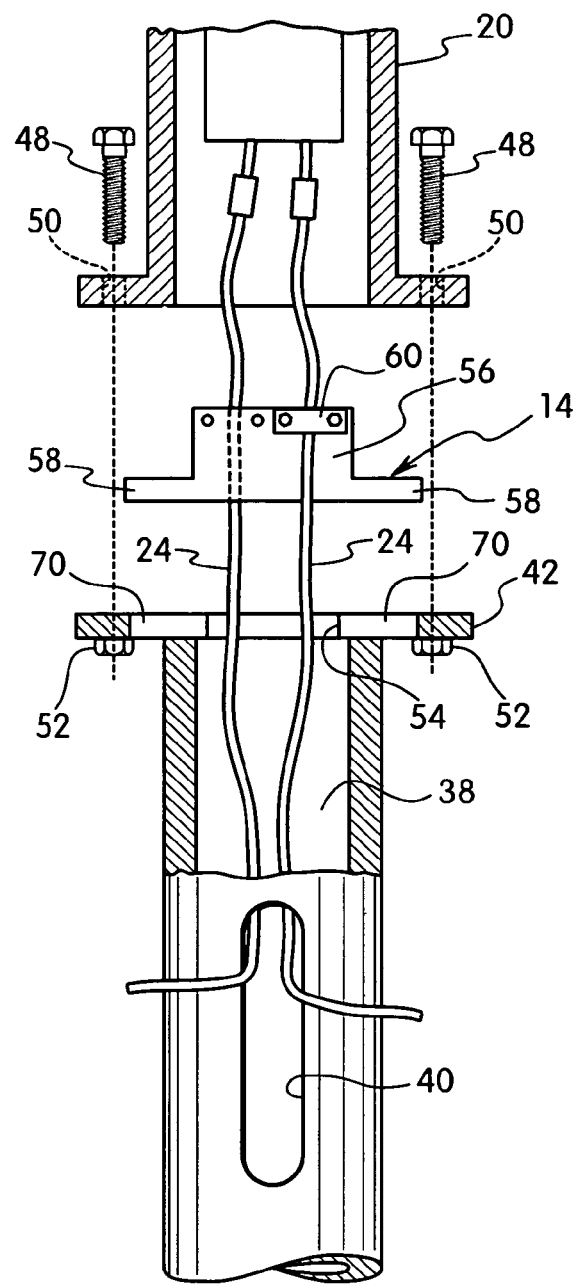
FIG. 8 is an exploded cross-sectional view of the electrical device, foundation member and clamp assembly.

The body portion 28 of the foundation member 12 typically has a closed bottom end and a hollow axial passage as shown in FIG. 8. The cylindrical side wall of the body portion 28 has an opening 40 for receiving the electrical wiring 24.

The top end 30 of the cylindrical body portion 28 includes a base 42. Base 42 has a generally planar configuration forming a plate with a dimension for attaching to the lamp pole 16 or other electrical device and supporting the lamp pole in an upright position. Base 42 in the embodiment shown has a substantially square configuration and is fixed to the top end of the body portion 28. The base 42 can be welded to the top end of the foundation body portion 28 or attached by suitable fasteners. Preferably, base 42 is fixed to the body portion and has a thickness and dimension sufficient for supporting the lamp pole 16.

Base 42 includes a plurality of mounting holes for receiving mounting bolts 48 for coupling the lamp pole 16 to the base. In the embodiment shown, the mounting holes in the base 42 are defined by four slots 44 extending radially outward from a central opening 46. The slots 44 have a dimension to receive the bolt 48 and can slide along the respective slot to align the bolts with the bolt holes in the base. The bolt 48 passes through corresponding bolt holes 50 in the base 20 of the lamp pole 16. The bolts 48 pass through the base 20 of the lamp pole 16 and through the slots 44 of the base 42. Nuts 50 and suitable washers and plates are then attached to the bolts to secure the lamp pole base 20 to the base 42.

Figure 5:
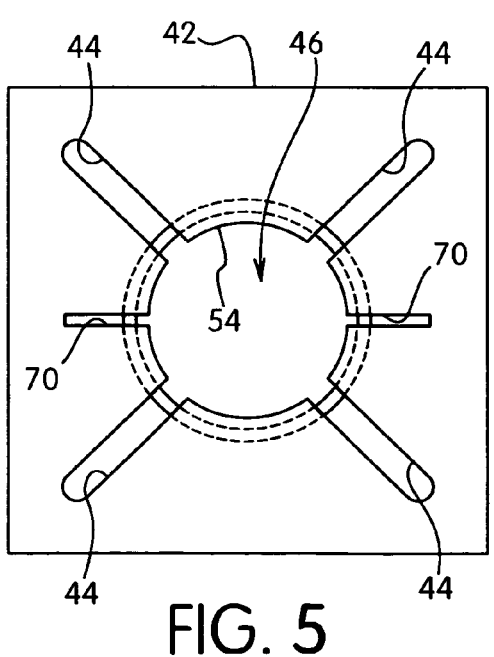
FIG. 5 is a top view of the foundation member in the embodiment of FIG. 4.
Figure 6:
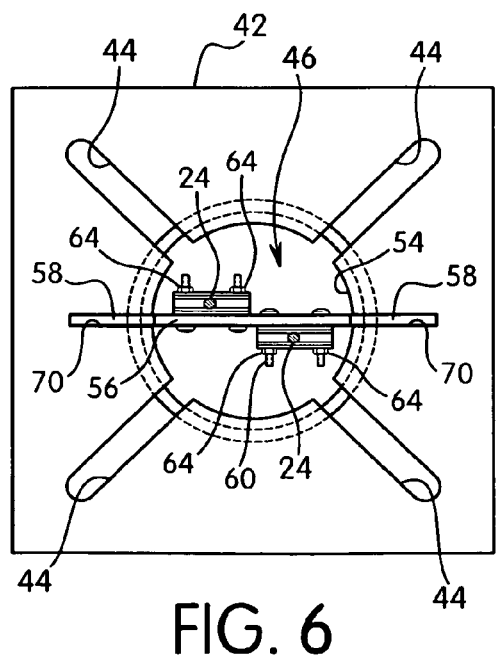
FIG. 6 is a top view of the foundation member and clamp assembly in the embodiment of FIG. 4.

Base 42 has a central opening 46 with a dimension to allow the electrical wires to pass through the axial passage of the body portion 28 of the foundation member 12 and to supply the wires through the lamp base to the lamp pole 16. As shown in FIGS. 5 and 6, the central opening 46 has a substantially circular shape with a diameter slightly less than the inner diameter of the side wall of the body portion 28. As shown in FIGS. 5 and 6, the inner edge 54 of base 42 extends inwardly into the axial passage 38.

Figure 7:
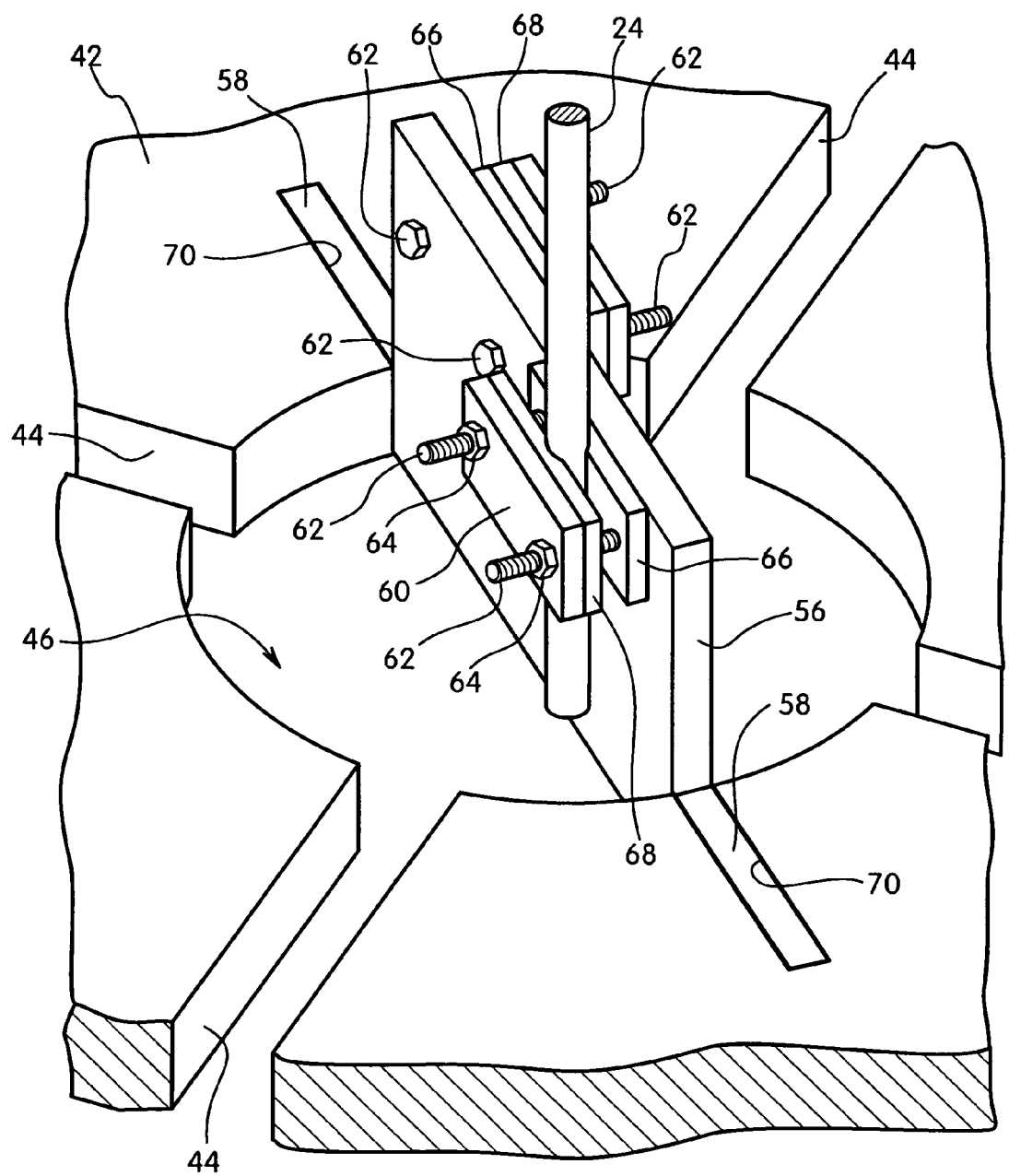
FIG. 7 is a partial perspective view of the foundation member and the clamp assembly clamping an electrical cable.

The clamp assembly 14 cooperates with the base 42 for clamping the wires 24 passing through the axial passage 46. In the embodiment shown in FIGS. 4 and 7-9, the clamping assembly 14 has a substantially flat planar configuration with a main body 56 and outwardly extending legs 58. A movable clamping plate 60 is coupled to the main body 56 by bolts 62 and corresponding nuts 64. A compressible pad 66 is attached to the opposite sides of the main body 56 and a flexible pad 68 is attached to the inner side of the movable plate 60. The pads 66 and 68 are able to clamp the electrical wire 24 passing through the clamp assembly 14 by tightening the nuts 64 on the bolts 62 as shown in FIG. 7.

In the embodiment illustrated, the clamp assembly 14 includes two movable clamping plates 60 on opposite sides of the main body 56 for clamping one or more wires passing through the axial passage of the foundation member and the base 42. In other embodiments, the clamping plates can be attached to the same side of the main body 56. As shown, the movable clamping plates 60 are aligned with each other and positioned at opposite ends of the main body 56 so that the bolts 62 do not interfere with one another.

Figure 4:
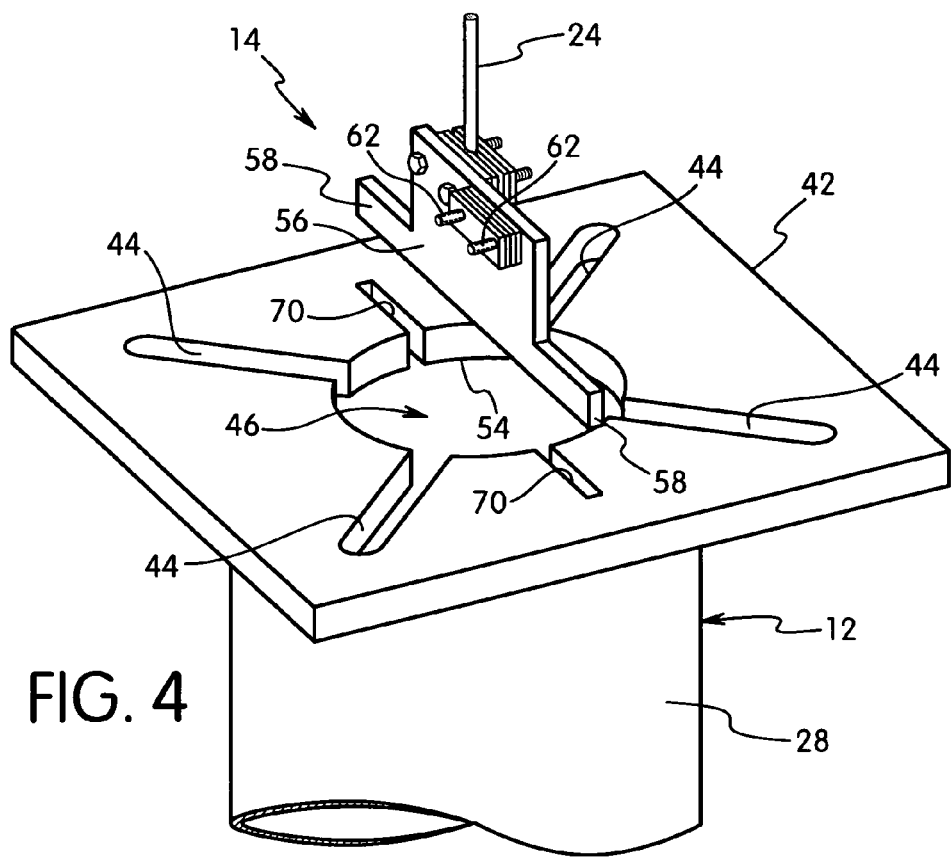
FIG. 4 is a perspective view of the foundation member and clamp assembly in the embodiment of FIG. 3.
Figure 9:
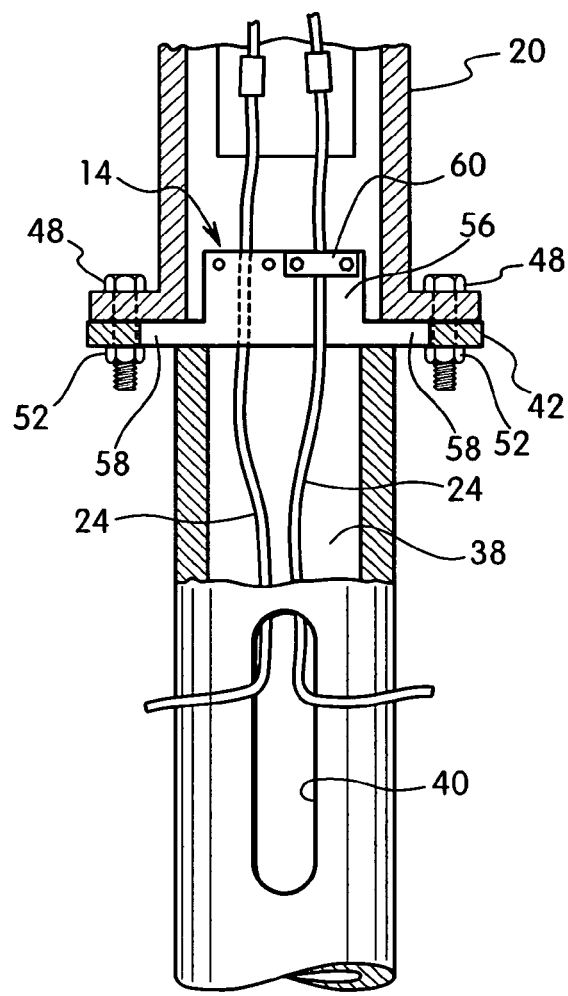
FIG. 9 is a cross-sectional view of the assembled electrical device, foundation member and clamp assembly of FIG. 8.

As shown in FIGS. 4 and 5, the base 42 includes a recess for receiving the respective legs 58 of the clamp assembly 14. In one preferred embodiment, the recess is a pair of slots 70 extending radially outward from the central opening 46 and preferably bisecting the central opening 46 so that the clamp assembly 14 is positioned in the center of the central opening as shown in FIG. 6. Each slot 70 passes through the base from the top surface to the bottom surface. The legs 58 have a height and length corresponding substantially to the dimensions of the slot 70 so that the legs 58 fit within the slots as shown in FIG. 7. In one embodiment, the legs 58 are received within the respective slot 70 and contact the top end of the body portion 28 of the foundation member as shown in the cross-sectional view of FIG. 9. In this manner, the top end 30 of the body portion 28 supports the clamp assembly 14. The lamp base 20 of the lamp pole 16 is attached to the base 42 of the foundation member 12 to overlie the top edge of the legs 58 of the clamp assembly 14 as shown in FIG. 9 thereby capturing the clamp assembly 14 between the top end of the body portion 28 and the bottom surface of the lamp base 20. A plurality of slots 70 can be provided in different locations to allow placement of the clamp assembly in different positions as needed.

During use, the foundation member 12 is positioned in the ground as shown in FIGS. 1 and 3 to the desired depth. The electrical wires 24 are fed through the opening 40 in the side wall of the body portion 28 and fed upwardly through the axial passage 38. The wires are fed through the clamp assembly 14 and the bolts 62 are tightened to clamp the wires to the clamp assembly as shown. The clamp assembly is then positioned in the slot 70 as shown in FIG. 7 and the lamp pole 16 is attached to the base 42 as shown in FIGS. 8 and 9 thereby capturing the clamp assembly between the foundation member and the lamp pole. The lamp base 20 typically has the access door 22 to allow the wires 24 to be coupled to the wiring of the lamp pole by suitable connectors 72 as shown in FIGS. 8 and 9. In one preferred embodiment, the clamp assembly 14 is positioned below the access doors 22 in the lamp base 20 so that once the lamp pole is mounted on base 42, the bolts 62 of the clamp assembly are not readily accessible. The inaccessible bolts 62 prevent the wires from being easily removed from the foundation assembly 10 and the conduits extending between adjacent foundation assemblies. The dimensions of the central opening in the base 42 are also sufficiently limited to prevent a tool from being inserted below the clamp assembly 14 to cut the wires below the clamp assembly thereby preventing the wires from being easily removed.

Figure 10:
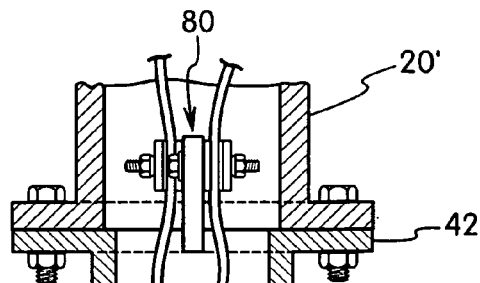
FIG. 10 is a partial cross-sectional side view of the foundation member and clamp assembly.
Figure 11:
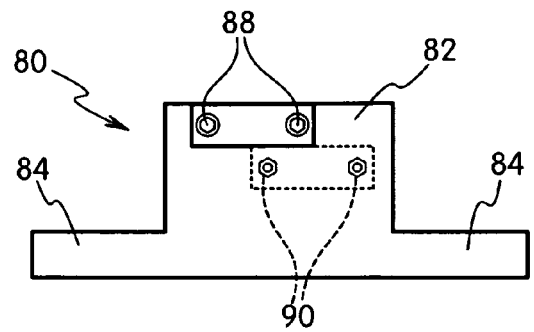
FIG. 11 is a front elevational view of the clamp assembly in a second embodiment of the invention.
Figure 12:
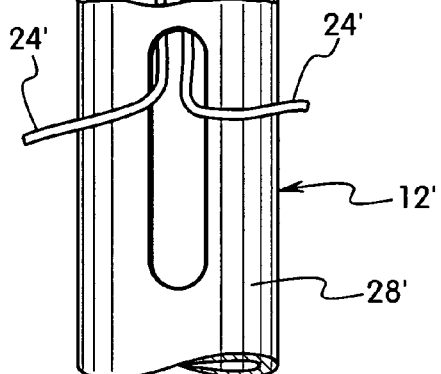
FIG. 12 is a top view of the foundation member of the embodiment of FIG. 11.
Figure 12:
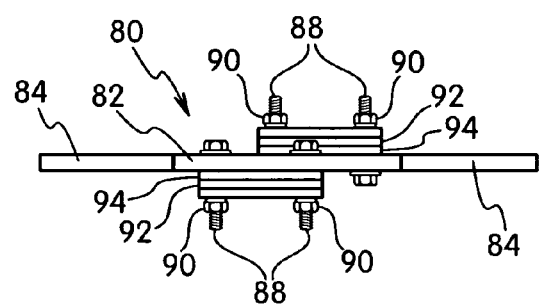

FIGS. 10-12 show a second embodiment of the clamp assembly of the invention. The clamp assembly 80 of this embodiment is similar to the clamp assembly of the previous embodiment. The foundation member and lamp pole are substantially the same as in the previous embodiment so that the same components are identified by the same reference number with the addition of a prime.

As shown in FIGS. 11 and 12, clamp assembly 80 includes a main body 82 with legs 84 extending outwardly from the main body. Movable clamp plates 86 are attached to opposite sides of the main body 82 by bolts 88 and nuts 90. The movable clamp plates are staggered in the axial direction to overlap each other along the height and width of the main body 82 as shown in FIGS. 11 and 12. The movable clamp plates 86 include a flexible pad 92 for mating with a flexible pad 94 coupled to the main body 82 as in the previous embodiment for clamping the electrical wiring as shown in FIG. 10.

Another embodiment of the clamp assembly 100 is shown in FIGS. 13-16. The foundation member and the corresponding base and the lamp pole are substantially the same as in the previous embodiment so that the same components are identified by the same reference number with the addition of a prime.

The clamp assembly 100 is similar to the clamp assembly of the previous embodiment and include a main body 102 having a pair of legs 104 extending outwardly for being received within the slot 70' as in the previous embodiment. The main body 102 includes holes for receiving the bolts 106 for coupling the movable clamp members 108 to the main body 102.

The movable clamp members 108 have a body 110 with holes 112 aligned with the holes in the main body 102 for receiving the bolts 106. The body 110 includes a resilient pad 114 which mates with a resilient pad 116 on the main body 102.

The body 110 of the movable clamp 18 has a dimension to effectively clamp the electrical wiring passing between the pads and passing through the axial passage of the foundation member 12. In the embodiment shown, the holes in the main body for receiving the bolts are aligned side by side so that the movable clamps 108 can be attached on opposite sides of the main body 102.

Figure 13:
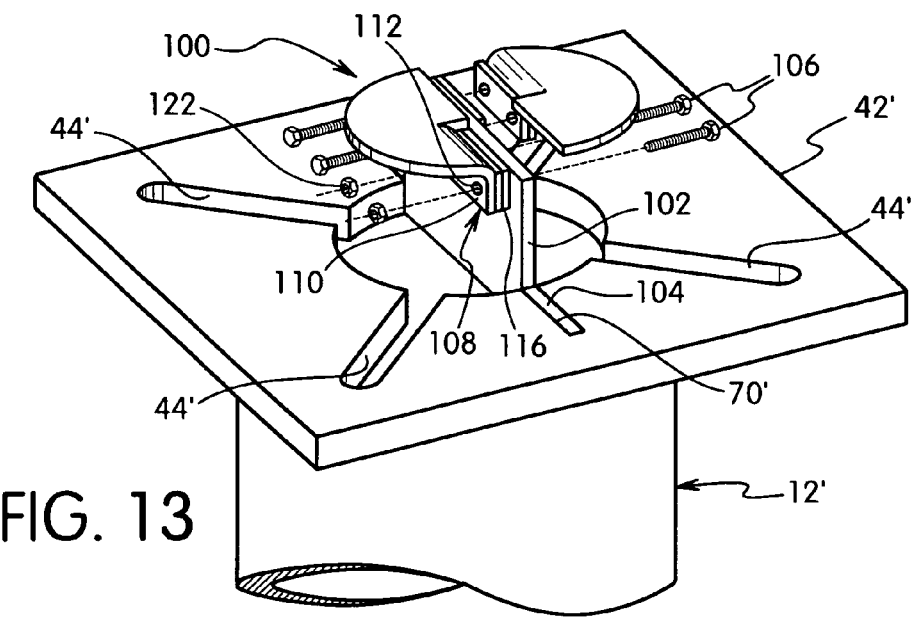
FIG. 13 is a perspective view of the foundation member and clamp assembly in another embodiment of the invention.
Figure 14:
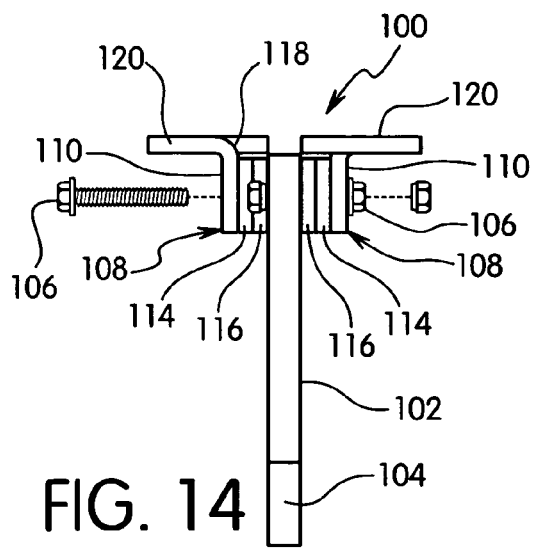
FIG. 14 is an end view of the clamp assembly in the embodiment of FIG. 13.
Figure 15:
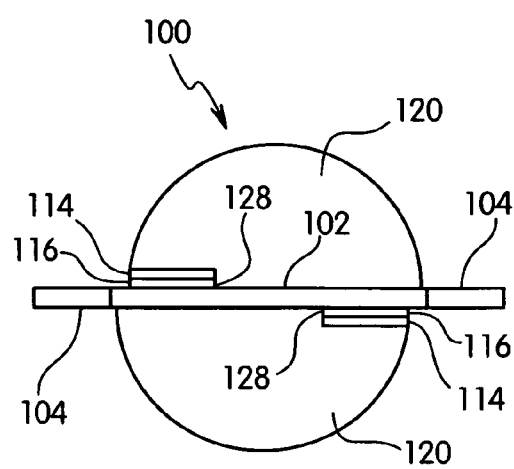
FIG. 15 is a top view of the clamp assembly of the embodiment of FIG. 13.

The movable clamp 108 has a top edge 118 and a shield 120 coupled to the top edge 118 as shown in FIGS. 13 and 14. In the embodiment illustrated, the shield 120 has a substantially semi-circular shape although the shape of the shield can be rectangular or square as desired. The shield extends outwardly from the movable clamp a distance to overlie the nuts 22 and bolts 106 to limit access to the bolts from the top end of the foundation member. The shield preferably has a length to extend substantially the length of the main body 102 as shown in FIG. 15 to overlie the nuts and bolts for each movable clamp member 108.

Figure 16:
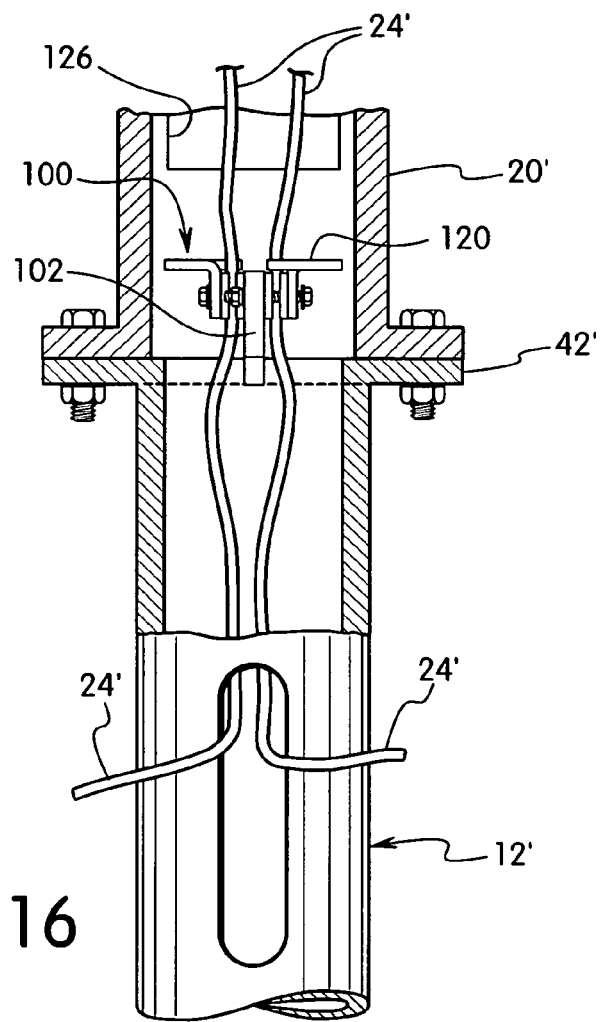
FIG. 16 is a cross-sectional view of the assembled foundation member and clamp assembly of the embodiment of FIG. 13.

In use, the foundation member is positioned in the ground as in the previous embodiment and the electrical wires are fed through the axial passage and through the opening in the base. The wires are fed through the clamp assembly 100 and clamped by the respective movable clamps 108 by tightening the nuts 122 and bolts 106. The lamp base 20 is then attached to the top end of the base 42 as shown in FIG. 16 by the bolts 124. The access door 126 in the lamp base 20 is positioned above the clamp assembly 100. The shields 120 of each movable clamp 108 limit access to the bolts through the access door to prevent unauthorized tampering with the clamp assembly and unauthorized removal of the electrical wires once the lamp base 20 is mounted to the foundation member.

In the embodiments of the invention, the clamp assembly is positioned on the base of the foundation member in a location such that the clamping bolts are not readily accessible after the lamp base or other electrical device is mounted to the foundation member. The clamp assembly resists unauthorized removal of the wiring by cutting and pulling on the wiring which otherwise can result in hundreds of feet of electrical wiring being pulled from the conduit. The clamp assembly preferably grips the wiring with sufficient force so that pulling on the wires will result in the wires breaking at the clamp assembly rather than being pulled through the clamp assembly.

In the embodiment of FIGS. 13-16, the shield 120 is integrally formed with the movable clamp 108 as a one-piece assembly by cutting the movable clamp from a blank and bending a portion to define the shield 120. Alternatively, the shield 120 can be a separate component that is welded to the top edge of the movable clamp 108. In the embodiment shown, the shield 120 has a tab portion 128 with a length and width to overlie the bolts adjacent the respective movable clamp 108 so that the bolts are not visible or accessible from above.

While various embodiments have been chosen to illustrate the features of the invention, it will be understood by those skilled in the art that various changes and modifications can be made without departing from the scope of the invention as defined in the appended claims.

What is claimed is:

1. A foundation member for supporting an above ground electrical device, said foundation member comprising:
    a body portion adapted for positioning in the ground, said body portion having a top end, a bottom end, and an axial passage for carrying an underground electrical cable to the electrical device;
    a base coupled to said top end of said body portion, said base having a recess and a central opening defining a passageway aligned with the axial passage of the body portion for receiving the electrical cable and being adapted for coupling to and supporting the electrical device, said recess being a slot extending outwardly from said central opening; and
    a clamp assembly having a main body and an outwardly extending leg received in said slot of said base for clamping the electrical cable passing through said passageway of said base and deterring theft of the underground cable through said body.

2. The foundation member of claim 1, wherein
    said base being adapted for coupling to and supporting the electrical device, and being fixed to the top end of the body portion, said clamp assembly being received in said slot in said base and being captured between the electrical device and said body portion.

3. The foundation member of claim 2, wherein said clamp assembly comprises
    a movable clamp plate coupled to said main body for clamping the electrical cable to said foundation member.

4. The foundation member of claim 3, wherein
    said movable clamp plate has an integrally formed shield at a top end thereof.

5. The foundation member of claim 3, wherein
    said main body is oriented substantially perpendicular to a plane of said base and extends from said top surface of said base.

6. The foundation member of claim 3, wherein
    said main body and movable clamp plate have an aperture receiving a threaded bolt therein for clamping the electrical cable between the movable clamp plate and the main body.

7. The foundation member of claim 1, wherein
    said body portion includes a ground-engaging helical screw thread on an outer surface thereof for installation of the foundation member in the ground.

8. A foundation member for supporting an above ground electrical device and deterring theft of underground electrical cable, said foundation member comprising:
    a body portion adapted for embedding in the ground and having an axial passage for receiving the underground electrical cable, said body portion has a top end with a base, said base having a central opening forming a passageway adapted to receive the electrical cable, and a recess formed in a top surface of said base and extending radially from said central opening; and
    a clamp assembly having a main body and a movable clamp plate for clamping to an end portion of the underground electrical cable and resisting removal of the underground electrical cable from the foundation member and the ground, said clamp assembly being received in said recess in said base.

9. The foundation member of claim 8, wherein
said electrical device is a lamp pole attached to said body portion.

10. The foundation member of claim 8, wherein said clamp assembly comprises
a leg extending from said main body and received in said recess to be captured between the body portion and the electrical device.

11. The foundation member of claim 10, wherein
said recess in said base is a slot extending radially outward from said central opening; and
said leg has a height substantially equal to a dimension of said slot.

12. The foundation member of claim 10, wherein
said main body extends in a direction substantially perpendicular to said base.

13. The foundation member of claim 12, wherein
said main body is oriented in said central opening in said base.

14. The foundation member of claim 10, wherein
said movable clamping plate has at least one aperture and a bolt extending through said aperture for coupling said movable clamping plate to said main body.

15. The foundation member of claim 10, wherein
said clamp assembly has a bolt for coupling a movable clamp plate to said main body; and
said clamp assembly has a shield at a top end thereof with a dimension to obstruct access to said bolt.

16. The foundation member of claim 10, wherein
said recess in said base is a slot extending radially from said central opening, and where said leg is received in said slot.

17. The foundation member of claim 16, wherein
said clamp assembly has a pair of said legs extending from said main body and where each of said legs are received in said slot.

18. The foundation member of claim 8, wherein
said recess in said base is a slot, and
said clamp assembly has a leg received in said slot.

19. The foundation member of claim 8, wherein
said recess in said base is a slot extending between a top surface and a bottom surface of said base, and
said main body of said clamp assembly has a pair of outwardly extending legs, said legs being received in said slot and having a height corresponding substantially to a dimension of said slot.

20. The foundation member of claim 8, wherein
said recess in said base is a pair of slots extending outward from said central opening; and
said clamp assembly has outwardly extending legs received in said slots.

21. The foundation member of claim 20, wherein
said clamp assembly has a main body and a movable clamping plate, said legs extending outwardly from said main body.

22. A method of deterring theft of underground electric cable, said method comprising the steps of
providing a foundation member having a body portion embedded in the ground, said body portion having an axial passage for carrying the electrical cable to the surface of the ground, a base with a central opening forming a passageway, and a recess extending radially from said central opening in said base,
positioning a clamp assembly in said recess,
capturing the clamp assembly between a top surface of the body portion and an electrical device mounted on the base of the foundation member; and
feeding the electrical cable through the body portion and cable clamp assembly and clamping the electrical cable to deter removal of the underground cable.

23. The method of claim 22, wherein
said clamp assembly includes a main body and a movable clamping plate, said main body being oriented substantially perpendicular to a plane of the base, said main body having a leg positioned in the recess, said method further comprising
clamping the electrical cable between the main body and the movable clamping plate.

24. A foundation member for supporting an electrical device, said foundation member comprising
a body portion adapted for inserting into the ground, said body portion having a top end, a bottom end, and an axial passage for carrying underground electrical cable to the electrical device;
a base coupled to said top end of said body portion, said base having an opening defining a passageway aligned with the axial passage of said body portion for receiving electrical cable; and
a clamp assembly for clamping the electrical cable passing through the opening in the base to resist removal of the electrical cable, said clamp assembly having a fixed main body and at least one movable clamping plate and a bolt coupling said fixed main body and movable clamping plate for clamping the electrical cable, said movable clamping plate having a shield with a dimension to obstruct access to said bolt, said shield extending outwardly from said movable clamping plate and overlying said bolt.

25. The foundation member of claim 24, wherein
said main body and said movable clamping plate include a hole receiving said bolt for coupling said main body and clamping plate together, and where said bolt is shielded by said shield.

26. The foundation member of claim 24, wherein
said shield is integrally formed with said movable clamping plate as a one piece unit.

27. The foundation member of claim 24, wherein
said base has a recess extending radially from said central opening in said base and said clamp assembly is received in said recess and captured between said body portion and the electrical device.

28. The foundation member of claim 27, wherein
said clamp assembly has a leg received in said recess and said opening.

29. The foundation member of claim 28, wherein
said clamp assembly has a pair of outwardly extending legs, said legs being received in said slot.

30. The foundation member of claim 29 wherein
said slot extends through said base between a top surface and a bottom surface, and where said legs contact a top end of said body portion.

31. The foundation member of claim 27, wherein
said recess is a slot and where said main body has a pair of legs extending outwardly therefrom and where said legs are received in said slot.

* * * * *